(12) United States Patent
Balasubramaniam et al.

(10) Patent No.: US 11,983,623 B1
(45) Date of Patent: May 14, 2024

(54) DATA VALIDATION FOR AUTOMATIC MODEL BUILDING AND RELEASE

(71) Applicant: Workday, Inc., Pleasanton, CA (US)

(72) Inventors: Manjunath Balasubramaniam, Cupertino, CA (US); Parag Avinash Namjoshi, Foster City, CA (US); Hamdi Jenzri, Alameda, CA (US); Harikrishna Narayanan, Mountain View, CA (US)

(73) Assignee: Workday, Inc., Pleasanton, CA (US)

( * ) Notice: Subject to any disclaimer, the term of this patent is extended or adjusted under 35 U.S.C. 154(b) by 1446 days.

(21) Appl. No.: 15/906,905

(22) Filed: Feb. 27, 2018

(51) Int. Cl.
*G06N 3/08* (2023.01)
*G06F 16/215* (2019.01)
*G06N 5/022* (2023.01)

(52) U.S. Cl.
CPC ............. *G06N 3/08* (2013.01); *G06F 16/215* (2019.01); *G06N 5/022* (2013.01)

(58) Field of Classification Search
CPC ......... G06N 3/08; G06N 5/022; G06F 16/215
USPC ........................................................ 707/637
See application file for complete search history.

(56) References Cited

U.S. PATENT DOCUMENTS

| | | | |
|---|---|---|---|
| 7,428,514 B2 * | 9/2008 | Jin ......................... | G06N 3/126 706/45 |
| 7,444,310 B2 * | 10/2008 | Meng ..................... | G06Q 10/10 706/45 |
| 8,027,938 B1 * | 9/2011 | Xu ......................... | G06N 20/00 706/12 |
| 10,423,403 B1 | 9/2019 | Natarajan | |
| 10,699,404 B1 * | 6/2020 | Nussbaum ............... | G06T 7/001 |
| 11,043,026 B1 * | 6/2021 | Fathi ...................... | G06N 20/00 |
| 2002/0083067 A1 | 6/2002 | Tamayo | |
| 2011/0055127 A1 * | 3/2011 | Umblijs .................. | G06N 5/025 706/12 |
| 2011/0213757 A1 * | 9/2011 | Bhaskaran ............... | G06F 30/00 707/687 |
| 2012/0170834 A1 * | 7/2012 | Wang ..................... | G06K 9/6265 382/159 |
| 2014/0164059 A1 * | 6/2014 | Dove ...................... | G06N 5/003 705/7.31 |
| 2014/0279754 A1 | 9/2014 | Barsoum | |
| 2015/0109443 A1 * | 4/2015 | Nichols .................. | G06T 7/001 348/148 |
| 2015/0134413 A1 | 5/2015 | Deshpande | |
| 2015/0193697 A1 | 7/2015 | Vasseur | |
| 2015/0339572 A1 | 11/2015 | Achin | |
| 2016/0180264 A1 | 6/2016 | Beck | |
| 2016/0180291 A1 | 6/2016 | Beck | |
| 2017/0004414 A1 * | 1/2017 | Flores .................... | G06N 3/044 |
| 2017/0193545 A1 * | 7/2017 | Zhou ..................... | G06Q 30/0254 |
| 2017/0372232 A1 * | 12/2017 | Maughan ............... | G06F 3/0482 |
| 2018/0024271 A1 * | 1/2018 | Koch ....................... | G01W 1/14 702/3 |
| 2018/0024859 A1 * | 1/2018 | Doshi .................... | G06F 9/5094 718/104 |

(Continued)

*Primary Examiner* — Cam Linh T Nguyen
(74) *Attorney, Agent, or Firm* — Van Pelt, Yi & James LLP

(57) ABSTRACT

A system for validating data includes an interface and a processor. The interface is configured to receive a data set. The processor is configured to calculate a data quality metric for the data set, wherein the data quality metric is based at least in part on a data distribution metric; determine a model to build based at least in part on the data quality metric; build the model; and provide the model for use.

24 Claims, 12 Drawing Sheets

(56) References Cited

U.S. PATENT DOCUMENTS

| | | |
|---|---|---|
| 2018/0032038 A1 | 2/2018 | Kang |
| 2018/0046926 A1 | 2/2018 | Achin |
| 2018/0096028 A1 | 4/2018 | Masekera |
| 2018/0124146 A1* | 5/2018 | Chen ................... H04L 65/61 |
| 2018/0146612 A1* | 5/2018 | Sauder ................ A01B 79/005 |
| 2018/0189826 A1* | 7/2018 | Xu .................... G06Q 30/0254 |
| 2018/0211373 A1 | 7/2018 | Stoppa |
| 2018/0293511 A1 | 10/2018 | Bouillet |
| 2019/0087239 A1 | 3/2019 | Adibowo |
| 2019/0130303 A1* | 5/2019 | Bigaj ..................... G06N 20/00 |
| 2019/0235846 A1* | 8/2019 | Janjua ...................... G06F 8/35 |
| 2020/0019493 A1* | 1/2020 | Ramakrishna ...... G06F 11/3688 |
| 2020/0186227 A1* | 6/2020 | Reider ................ H04B 7/0695 |

* cited by examiner

DATA VALIDATION FOR AUTOMATIC MODEL BUILDING AND RELEASE

BACKGROUND OF THE INVENTION

Computing systems commonly collect user data and analyze the user data to predict user needs and serve users better. For example, a movie recommendations website collects data describing user movie preferences and uses the data to build a model that is able to predict movies it believes the users will like. Construction of prediction models in this way is typically done using manual tuning to create an accurate model. Manual tuning requires the data scientist or model engineer to work closely with the data, creating a problem that in the event that the data scientist or model engineer is not able to access the data (e.g., because the data is private) tuning cannot be performed. Additionally, in the event a large number of models need to be created, tuning cannot be performed on each one. For software as a service systems, both problems can be present, wherein the software as a service provider desires to create one or more models for each of a large number of customers, wherein each model performs a prediction based on private customer data.

One approach to addressing the above problems is to remove the requirement that the data scientist or model engineer access customer data by instead processing the data using a secure computing system. This approach creates a new problem wherein the data needs to be processed using the secure computing system to determine whether the data is able to produce a high-quality model.

BRIEF DESCRIPTION OF THE DRAWINGS

Various embodiments of the invention are disclosed in the following detailed description and the accompanying drawings.

DETAILED DESCRIPTION

Figure 1:
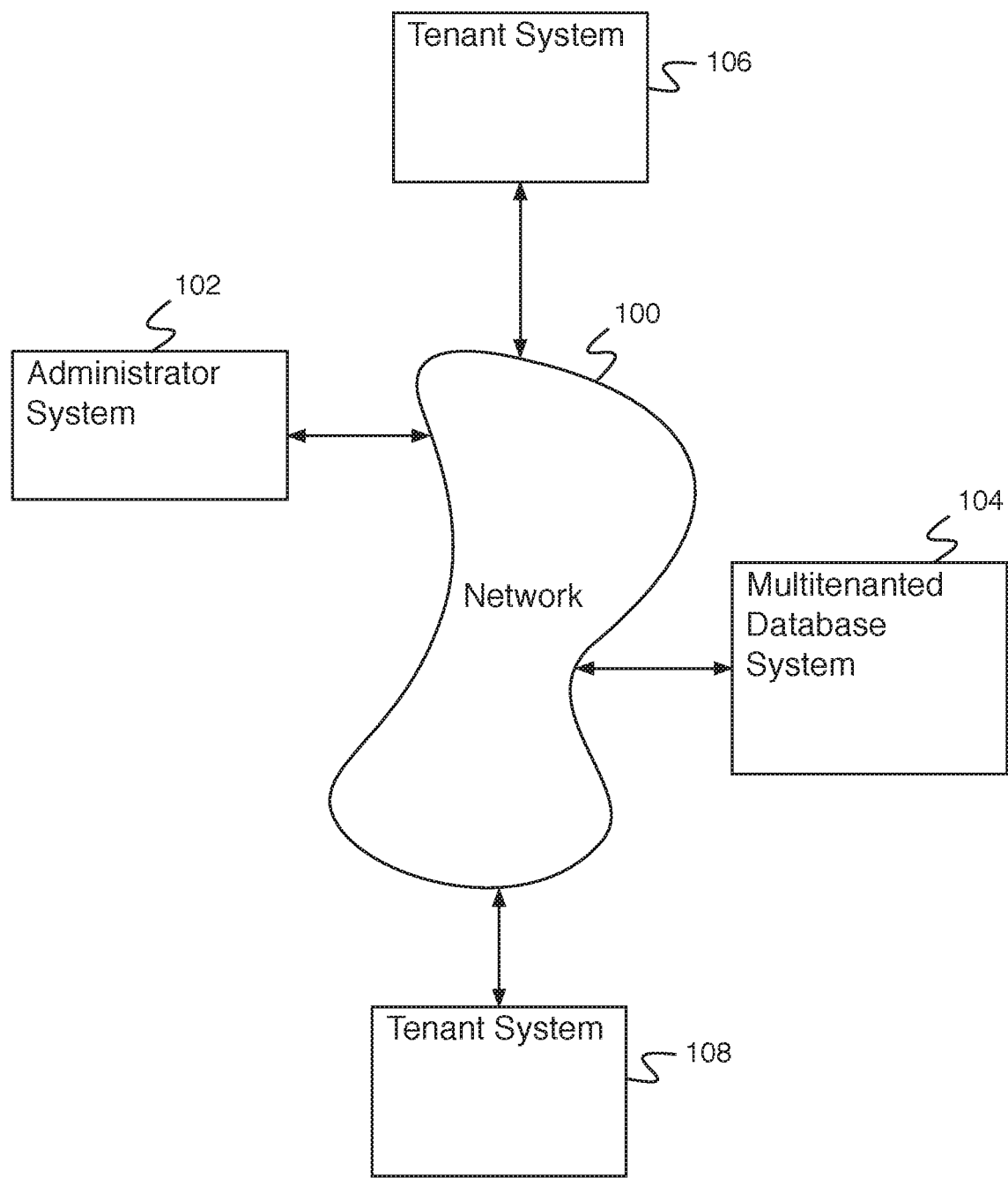
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for validating data comprises an interface configured to receive a data set, and a processor configured to calculate a data quality metric for the data set, wherein the data quality metric is based at least in part on a data distribution metric, determine a model to build based at least in part on the data quality metric, build the model, and provide the model for use. The system for validating data additionally comprises a memory coupled to the processor and configured to provide the processor with instructions.

A system for validating data comprises a system for validating data as part of an automatic model release system. The automatic model release system receives a data set and automatically builds a model (e.g., a machine learning model, a neural network, etc.) using the data. Prior to building the model the automatic model release system validates the data using a system for validating data to ensure the data is high enough in quality to produce a high quality model. The system for validating data receives a data set and calculates a data quality metric for the data set, wherein the data quality metric is based at least in part on a data distribution metric. A data quality metric based at least in part on a data distribution metric comprises a comparison of a data variance to a target data variance, a comparison of a data mean to a target data mean, or any other appropriate data quality metric based at least in part on a data distribution metric. A target data distribution (e.g., a target data variance or a target data mean) comprises a data distribution provided to the system for validating data (e.g., by a system administrator or data scientist) or a data distribution derived from other data (e.g., known good quality data belonging to a comparable entity or related data from which an idea can be determined regarding what the data statistics are supposed to be). When appropriate, one or more other tests are performed as part of determining a data metric—for example, a number of data points metric (e.g., determining whether the data set has enough data points), a number of data values metric (e.g., determining whether the data points of the data set take on enough distinct values), a data stability metric (e.g., determining whether the data statistics remain constant over time), a set of anomaly metrics (e.g., checks to determine whether specific data anomalies are present), etc.

Based on the data quality metric, the system determines a model to build. In the event the data quality metric comprises a very low value (e.g., indicating poor quality data), the system determines to build either no model or a very simple model. In the event the data quality metric comprises a very high value (e.g., indicating high quality data), the system determines to build a sophisticated model. In some cases, the determination of a very low value comprises values below a very low threshold and the determination of a very high value comprises values above a very high threshold. The system can include one or more additional data ranges corresponding to moderate model quality (e.g., separated by one or more pairs of minimum and maximum data range thresholds). Model parameters additionally can be chosen based on the data quality metric. The system then builds the determined model (e.g., using determined model parameters) and provides the model for use.

In some embodiments, the thresholds are determined empirically by examining past metrics and past quality or ranges that is/are acceptable and storing the thresholds for future model use.

The system for validating data improves the computing system by enabling the creation of models based on private tenanted data without violating the prohibition of sharing the tenanted data with a system administrator not associated with the tenant. Automatically validating data allows the system to automatically determine the model quality that the data is able to create and to automatically choose a model type and parameters that are most appropriate for the data. This enables rapid model creation and release allowing scaling the volume of model creation while maintaining segregation of tenant data.

FIG. 1 is a block diagram illustrating an embodiment of a network system. In some embodiments, the network system of FIG. 1 comprises a network system for a system for validating data. In the example shown, tenant system 106 and tenant system 108 store data on separate tenanted areas of multitenanted database system 104. Multitenanted database system 104 comprises a plurality of tenanted areas, each associated with a tenant comprising one or more tenant systems. Data stored in a tenanted area is only accessible to users and systems associated with the tenant and is not accessible to users or systems associated with other tenants or to administrators associated with multitenanted database system 104 (e.g., administrators accessing multitenanted database system 104 via administrator system 102 or a data scientist administrator accessing multitenanted database system 104 via a tenant system (e.g., tenant system 106 or tenant system 108) or administrator system 104). Administrator system 102 is able to administrate different components of the system including multitenanted database system 104.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, multitenanted database system 104, tenant system 106, and tenant system 108 communicate via network 100. Administrator system 102 comprises an administrator system for use by an administrator. Administrator system 102 comprises an administrator system for executing administrator commands, for configuring multitenanted database system 104, etc. Multitenanted database system 104 comprises a database system for providing tenant user access to data stored in a tenanted area of multitenanted database system 104 (e.g., access to add data, view data, modify data, delete data, access reports, execute business processes, etc.). Tenant system 106 and tenant system 108 comprise tenant systems for use by tenant users. A tenant user uses a tenant system to interact with multitenanted database system 104—for example, to store database data, to request database data, to request reporting based on database data, to request creation of a model based on database data, to use a model based on database data, etc. In some embodiments, the network system of FIG. 1 comprises a plurality of tenant systems associated with one or more tenants.

A tenant user uses a tenant system to provide an indication to multitenanted database system 104 to create a model for release. For example, the tenant user uses the tenanted system to provide the indication to create a model for release to a model release system of a tenanted system of multitenanted database system 104. A model release system of multitenanted database system 104 receives the indication, fetches data for creation of the model, and calculates a data quality metric for the data set, wherein the data quality metric is based at least in part on a data distribution metric. A model to build and/or model parameters for the model to build are determined based at least in part on the data quality metric.

In the event that the data quality metric is determined to be good enough (e.g., higher than a data quality good enough threshold), the model release system extracts features based at least in part on the data and validates the features using one or more feature quality metrics (e.g., a feature quality metric is above a validating threshold). In the event that validating the features indicates that the features are good enough (e.g., a feature quality metric is above a validating threshold), the model release system builds the model based at least in part on the features and the data, stores the model using a model storage system, and validates the model using one or more model quality metrics. In the event that validating the model indicates that the model is good enough, the model release system provides the model for use.

Figure 2:
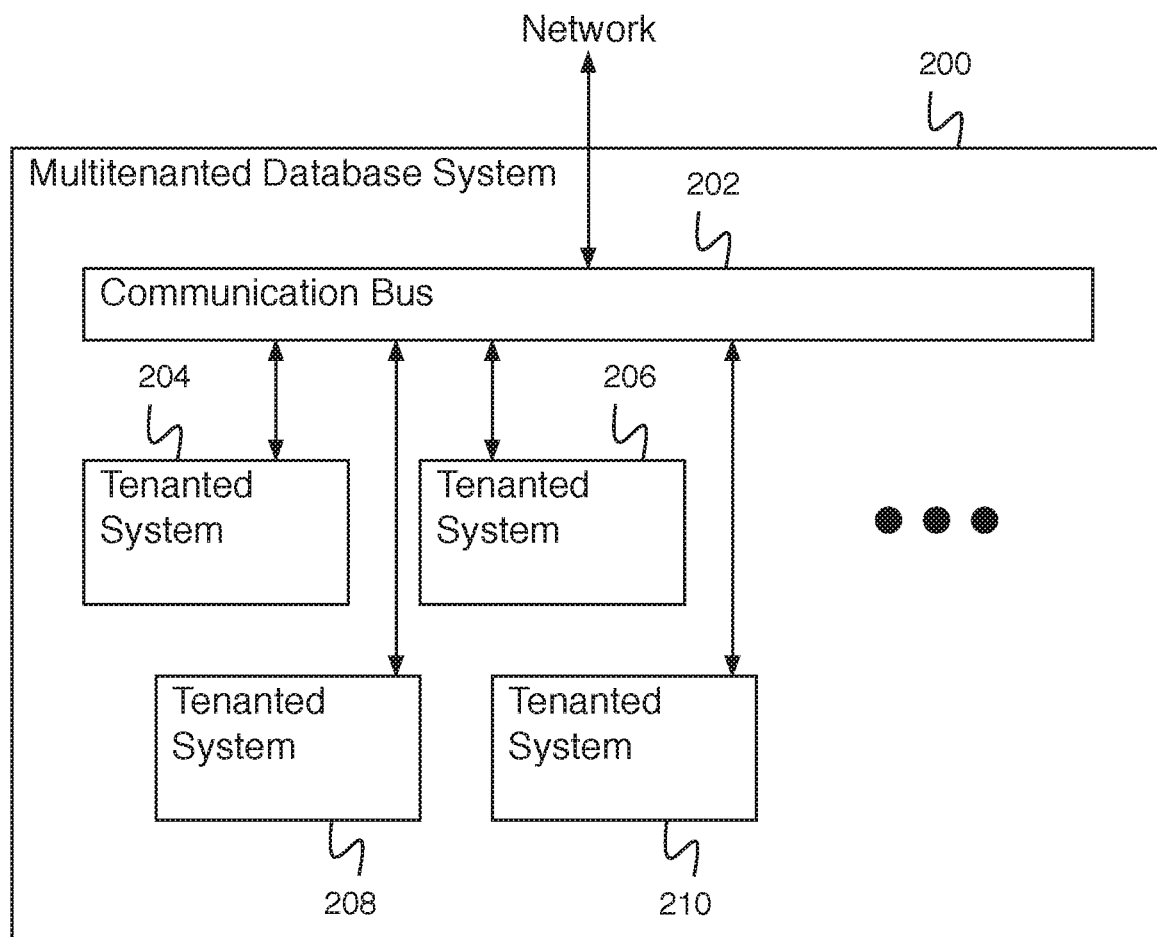
FIG. 2 is a block diagram illustrating an embodiment of a multitenanted database system.

FIG. 2 is a block diagram illustrating an embodiment of a multitenanted database system. In some embodiments, multitenanted database system 200 comprises multitenanted database system 104 of FIG. 1. In the example shown, multitenanted database system 200 comprises communication bus 202 and a plurality of tenanted systems (e.g., tenanted system 204, tenanted system 206, tenanted system 208, and tenanted system 210). Multitenanted database system comprises any appropriate number of tenanted systems (e.g., 1 tenanted system, 2 tenanted systems, 12 tenanted systems, 122 tenanted systems, 1543 tenanted systems, etc.). Communication bus 202 comprises a communication bus for allowing each of the tenanted systems to communicate with a network (e.g., with network 100 of FIG. 1). In some embodiments, communication bus 202 does not allow tenanted systems of multitenanted database system 200 to communicate with each other. Each tenanted system of multitenanted database system 200 comprises a system for automatic model release for building tenanted models based on tenanted data.

Multitenanted database system 200 receives an indication (e.g., from a tenant user using a tenant system) to create a model for release. For example, the indication to create a model for release is associated with a tenanted system of the plurality of tenanted systems. Communication bus 202 provides the indication to the appropriate tenanted system of the plurality of tenanted systems. A model release system of the appropriate tenanted system receives the indication, fetches data for creation of the model, and calculates a data quality metric for the data set, wherein the data quality metric is based at least in part on a data distribution metric. A model to build and/or model parameters for the model to build are determined based at least in part on the data quality metric.

In the event that the data quality metric is determined to be good enough (e.g., data quality metric is greater than a good enough threshold), the model release system extracts features based at least in part on the data and validates the features using one or more feature quality metrics (e.g., feature quality metric is greater than a quality threshold). In the event that validating the features indicates that the features are good enough, the model release system builds the model based at least in part on the features and the data, stores the model using a model storage system, and validates the model using one or more model quality metrics. In the event that validating the model indicates that the model is good enough, the model release system provides the model for use.

Figure 3:
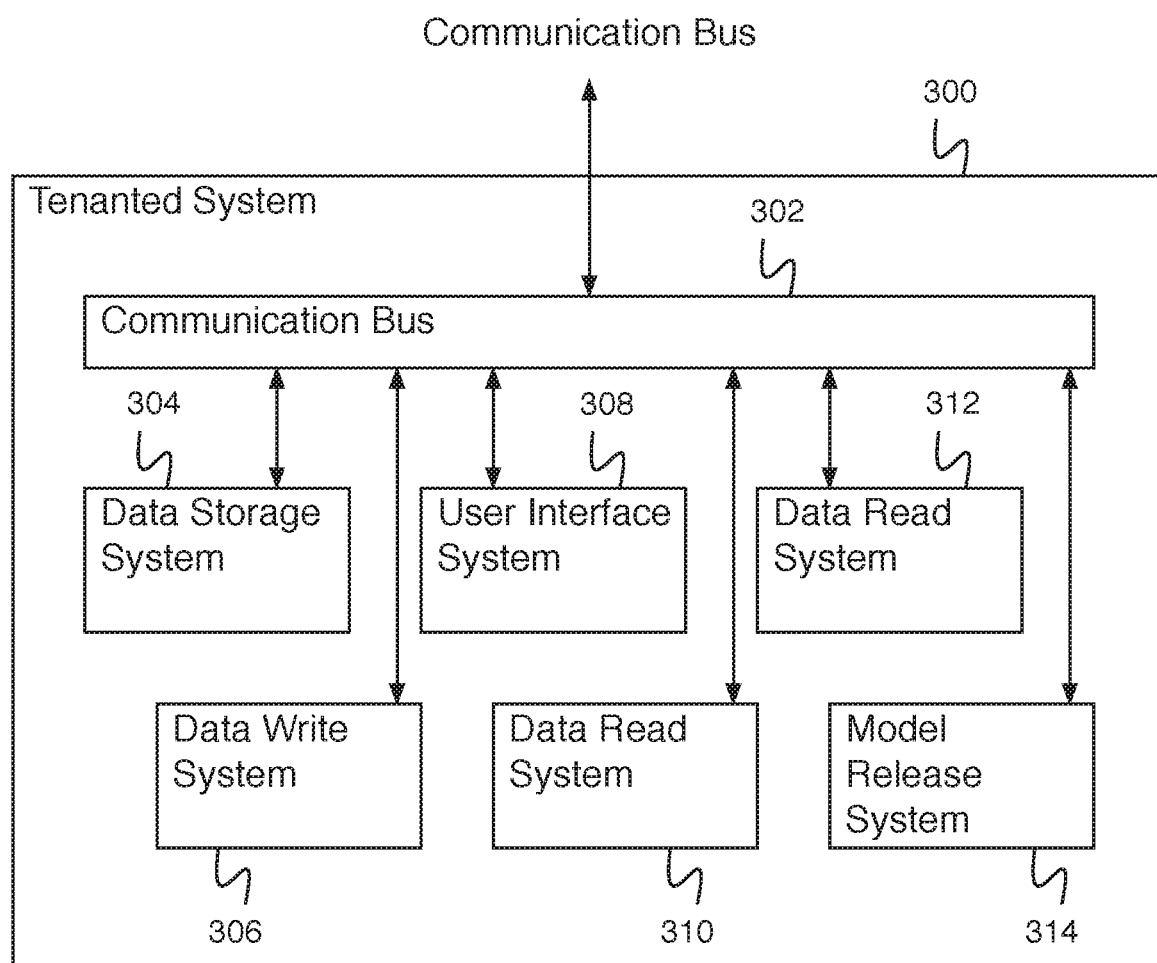
FIG. 3 is a block diagram illustrating an embodiment of a tenanted system.

FIG. 3 is a block diagram illustrating an embodiment of a tenanted system. In some embodiments, tenanted system 300 of FIG. 3 comprises a tenanted system of FIG. 2 (e.g., tenanted system 204 of FIG. 2). In the example shown, tenanted system 300 comprises communication bus 302, data storage system 304, data write system 306, user interface system 308, data read system 310, data read system 312, and model release system 314, Communication bus 302 comprises a communication bus for allowing each of the other systems of tenanted system 300 to communicate with an external communication bus (e.g., communication bus 202 of FIG. 2, e.g., for communicating with a network system) and to communicate with each other. Data storage system 304 comprises a data storage system for storing tenant data. Data write system 306 comprises a system for performing write operations on tenant data stored by data storage system 304. For example, a write operation comprises a write lock operation, a data write operation, a data verify operation, and an unlock operation. A write lock operation locks the data storage system to prevent any other read or write operations from occurring while the write lock is in place. User interface system 308 comprises a user interface system for providing a user interface to a user (e.g., a user interface for reading data, writing data, executing applications, executing reporting, requesting a model, using a model, etc.). Data read system 310 and data read system 312 comprise systems for performing read operations on tenant data stored by data storage system 304. For example, a read operation comprises a read lock operation, a data read operation, and an unlock operation. A read lock operation locks the data storage system to prevent write operations from occurring while the read lock is in place. Multiple read operations can occur simultaneously. Tenanted system 300 comprises any appropriate number of data read systems (e.g., 1 data read system, 4 data read systems, 11 data read systems, etc.). Model release system 314 comprises a system for automatically building and releasing a model (e.g., providing a model for use). Model release system 314 receives an indication from a user to build a model (e.g., via communication bus 302) and builds the model based at least in part on data stored in data storage system 304. Model release system 314 additionally receives an indication from a user to execute a stored model, executes the stored model, and provides model results to the user.

Tenanted system 300 receives an indication to create a model for release. For example, the indication to create a model for release is received from a tenant user using a tenant system. Communication bus 302 receives the indication and provides it to model release system 314. Model release system 314 receives the indication, fetches data for creation of the model, and calculates a data quality metric for the data set, wherein the data quality metric is based at least in part on a data distribution metric. A model to build and/or model parameters for the model to build are determined based at least in part on the data quality metric.

In the event that the data quality metric is determined to be good enough, model release system 314 extracts features based at least in part on the data and validates the features using one or more feature quality metrics. In the event that validating the features indicates that the features are good enough (e.g., feature metric is greater than a validating threshold), model release system 314 builds the model based at least in part on the features and the data, stores the model using a model storage system, and validates the model using one or more model quality metrics (e.g., a model quality metric is greater than a validating threshold). In the event that validating the model indicates that the model is good enough (e.g., one or more model quality metrics is greater than one or more validating thresholds), model release system 314 provides the model for use.

In some embodiments, the thresholds are determined empirically by examining past metrics and past quality that is acceptable and storing the thresholds for future model use.

In the example shown, tenanted system 300 comprises one of a plurality of tenanted systems of a multitenanted database system (e.g., multitenanted database system 200 of FIG. 2). Each tenanted system of the plurality of tenanted systems comprises a model release system (e.g., model release system 314). In some embodiments, the multitenanted database system comprises a model release system in communication with each tenant system of the plurality of tenant systems. The model release system in communication with each tenant system of the plurality of tenant systems receives indications to create a model for release associated with each of the plurality of tenant systems and stores information (e.g., data, data quality metrics, features, feature quality metrics, models, model quality metrics, etc.) in tenant-isolated partitions of a model storage system.

Figure 4:
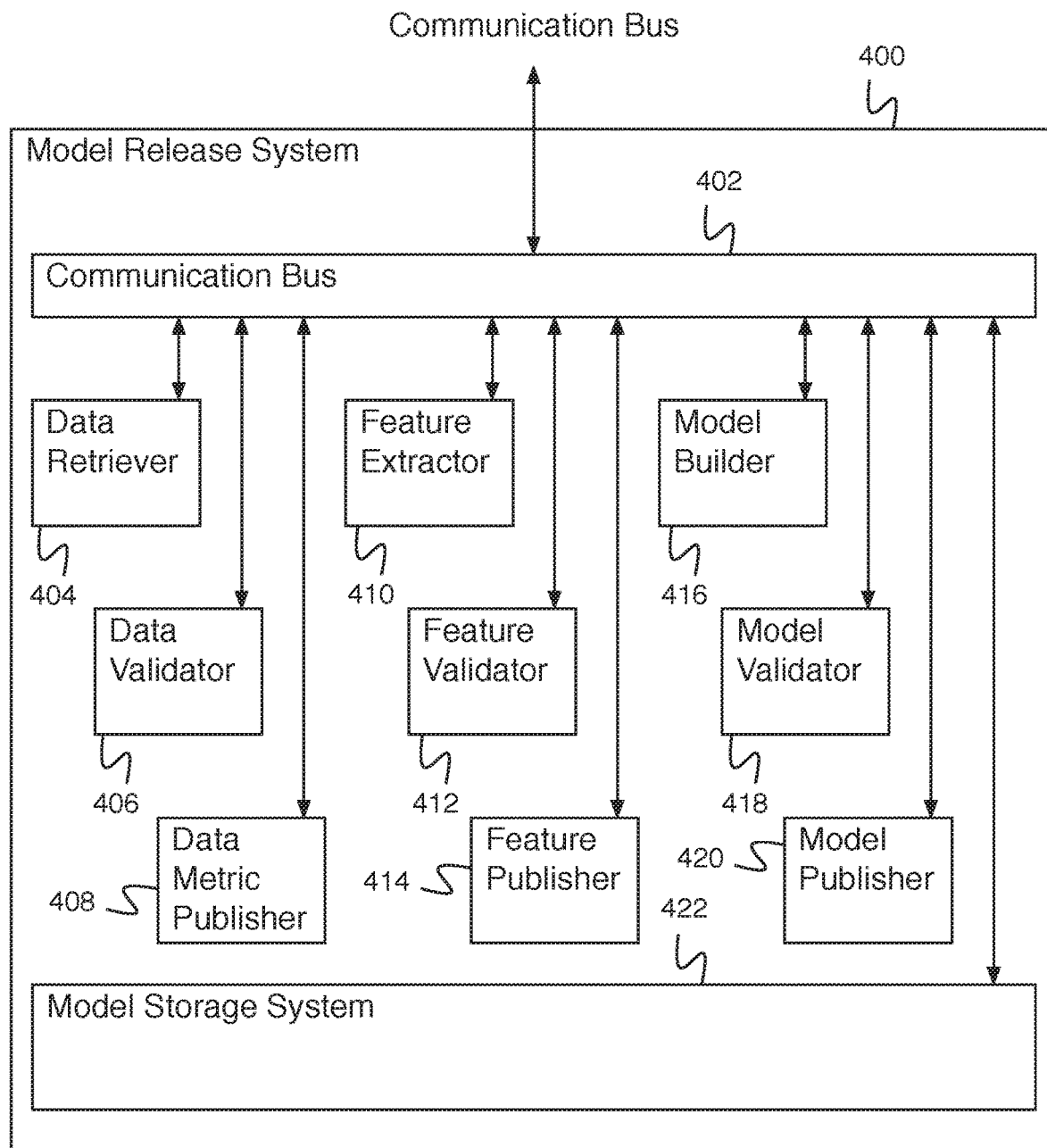
FIG. 4 is a block diagram illustrating an embodiment of a model release system.

FIG. 4 is a block diagram illustrating an embodiment of a model release system. In some embodiments, model release system 400 comprises model release system 314 of FIG. 3. In the example shown, model release system 400 comprises communication bus 402 for allowing the systems of model release system 400 to communicate with each other and with an external communication bus (e.g., communication bus 302 of FIG. 3). Data retriever 404 comprises a data retriever for retrieving data from a data storage (e.g., a data storage system of a tenanted system). Retrieved data is stored in model storage system 422. Retrieved data is used for building and validating a model. Data retriever 404 provides retrieved data to data validator 406 and feature extractor 416. Data validator 406 calculates a data quality metric for the data set, wherein the data quality metric is based at least in part on a data distribution metric, and determines whether the data quality metric is good enough (e.g., good enough to build a model). Data validator 406 additionally determines a model to build and/or model parameters for the model to build are determined based at least in part on the data quality metric.

Results from the data validation are provided to data metric publisher 408. Data metric publisher 408 publishes the data metrics by storing them to model storage system 422. Data metric publisher 408 sorts the data metrics, filters the data metrics, rounds the data metrics, packages the data metrics, selects appropriate data metrics, or prepares the data metrics for publishing in any other appropriate way. Results from the data validation are additionally provided to feature extractor 410 and model builder 416. In some embodiments, data validation results affect a decision of features to extract. Feature extractor 410 extracts features from data. Extracting features comprises computing functions of data. Features are extracted based on a feature extraction template, a feature extraction algorithm, feature extraction functions, etc. Extracted features are provided to feature validator 412 for validation. Feature validator 412 validates features based at least in part on one or more feature quality metrics. Feature quality metrics are provided to feature publisher 414 for publishing (e.g., for storage in model storage system 422). Features determined by feature extractor 410 are additionally provided to model builder 416. Model builder 416 builds the model (e.g., the model determined by data validator 406) using the features and data retrieved by data retriever 404. The model is then validated by model validator 418 using additional data retrieved by data retriever 404. In the event the model is determined to be good enough (e.g., model quality metric greater than a quality threshold), the model is published by model publisher 420. Publishing the model comprises storing it in model storage system 422, providing it for access via a user interface system, providing it for use, etc. Storing a model in model storage 422 comprises storing the model privately for a tenant.

Figure 5:
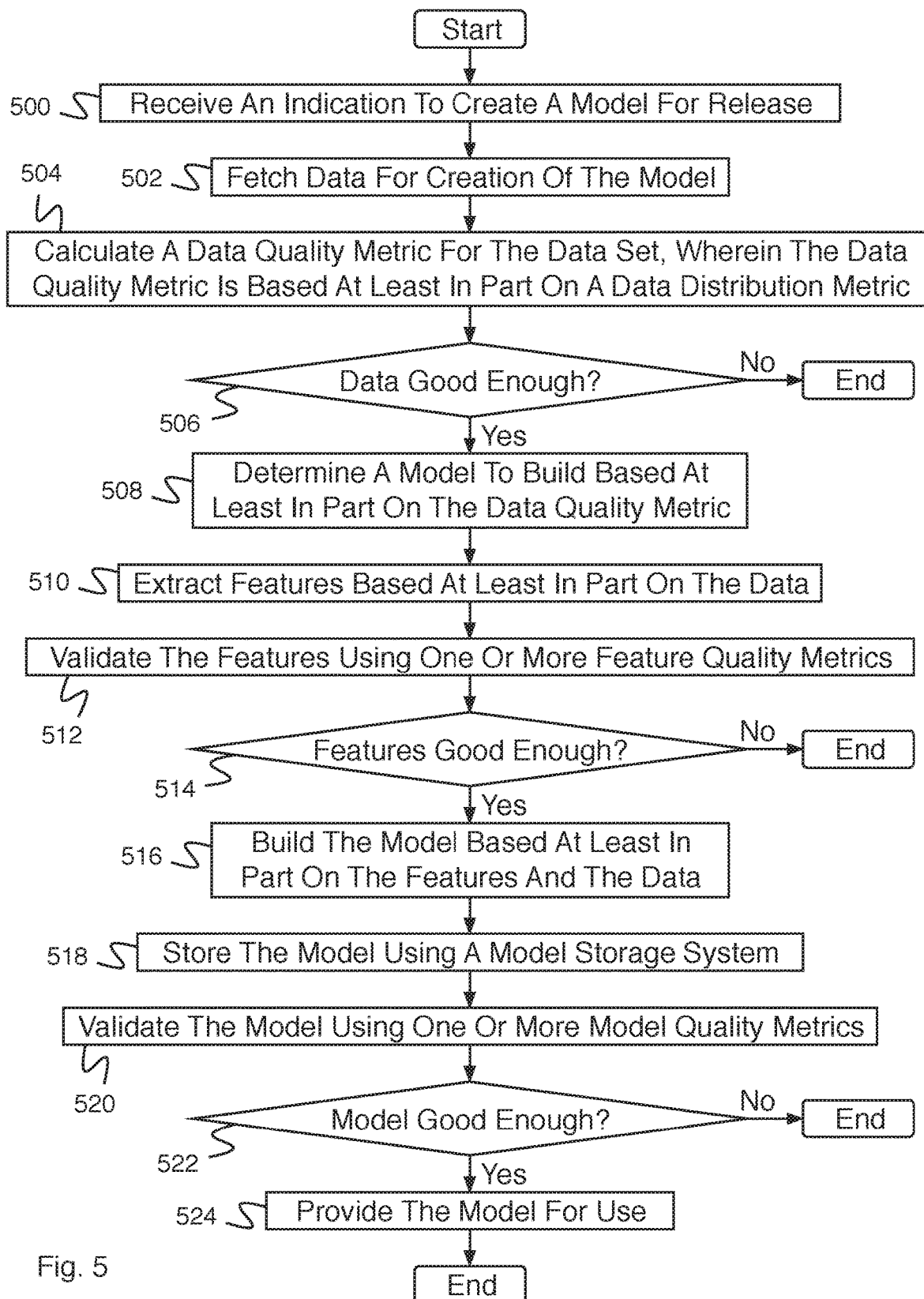
FIG. 5 is a flow diagram illustrating an embodiment for a process for a model release system.

FIG. 5 is a flow diagram illustrating an embodiment for a process for a model release system. In some embodiments, the process of FIG. 5 is executed by model release system 400 of FIG. 4. In the example shown, in 500, an indication to create a model for release is received. For example, the indication comprises a model type of a set of one or more model types. In 502, data is fetched for creation of the model. In 504, a data quality metric is calculated for the data set, wherein the data quality metric is based at least in part on a data distribution metric. For example, the data quality metrics are stored associated with the model or stored linked to the model (e.g., via a symbolic link, a pointer, an indication that the metrics are linked to the model, etc.). In 506, it is determined whether the data is good enough (e.g., whether the data quality metric indicates that the data will be able to create a good quality model—for example, above a threshold). The data used to build the model may comprise of one or more fields, sometimes hierarchical in nature. Final data quality metric(s) are based at least in part on mathematical function(s) of data quality for different fields. Individual data field's quality, may be based at least in part on a threshold on missing (null) data, on number of distinct values observed for a field, distance of the statistical distribution of the field against expected statistical distribution as specified by the data scientist. In the event it is determined that the data is not good enough, the process ends. In the event it is determined that the data is good enough, control passes to 508. In 508, a model to build is determined based at least in part on the data quality metric. For example, determining a model to build comprises determining a type of model, a model of a set of models, determining not to build a model, determining model parameters, etc.

In 510, features are extracted based at least in part on the data. In 512, the features are validated using one or more feature quality metrics. For example, the feature quality metrics are stored associated with the model or stored linked to the model (e.g., via a symbolic link, a pointer, an indication that the metrics are linked to the model, etc.). In 514, it is determined whether the features are good enough (e.g., whether the feature quality metrics indicate that the features will be able to create a good quality model—for example, above a threshold, distance of the statistical distribution of the field against expected statistical distribution of the field as specified by the data scientist, or its statistical association with variables of interest). In the event it is determined that the features are not good enough, the process ends. In the event it is determined that the features are good enough, control passes to 516. In 516, the model is built based at least in part on the features and the data. For example, the model is built using a first portion of the data. For example, the model is built using a selected model type of a set of one or more model types. In some embodiments, the selected model type of the set of one or more model types is based at least in part on the data or on the data quality metrics. In some embodiments, building the model comprises providing an indication of the data quality metric to an administrator or providing an indication of a critical data field to an administrator. For example, a critical data field comprises a data field largely responsible for a poor combined data quality metric (e.g., a data field with a large weight and a poor data quality metric). In 518, the model is stored using a model storage system. In 520, the model is validated using one or more model quality metrics. For example, the model is validated by running the model on a second portion of the data and comparing the model output to a third portion of the data. For example, the model quality metrics are stored associated with the model (e.g., stored using the model storage system) or stored linked to the model (e.g., via a symbolic link, a pointer, an indication that the metrics are linked to the model, etc.). In 522, it is determined whether the model is good enough (e.g., whether the model quality metrics indicate that the model is good enough—for example, is above a threshold for specified business or technical metric). In the event it is determined that the model is not good enough, the process ends. In the event it is determined that the model is good enough, control passes to 524. In 524, the model is provided for use. For example, the model is provided to a model storage system accessible to a user, the model is provided to a user interface system used by a user, etc. In some embodiments using the model (e.g., using the model in response to a user indication to use the model) comprises providing an indication of the data quality metric to a user or providing an indication of a determined model to build to the user.

Figure 6:
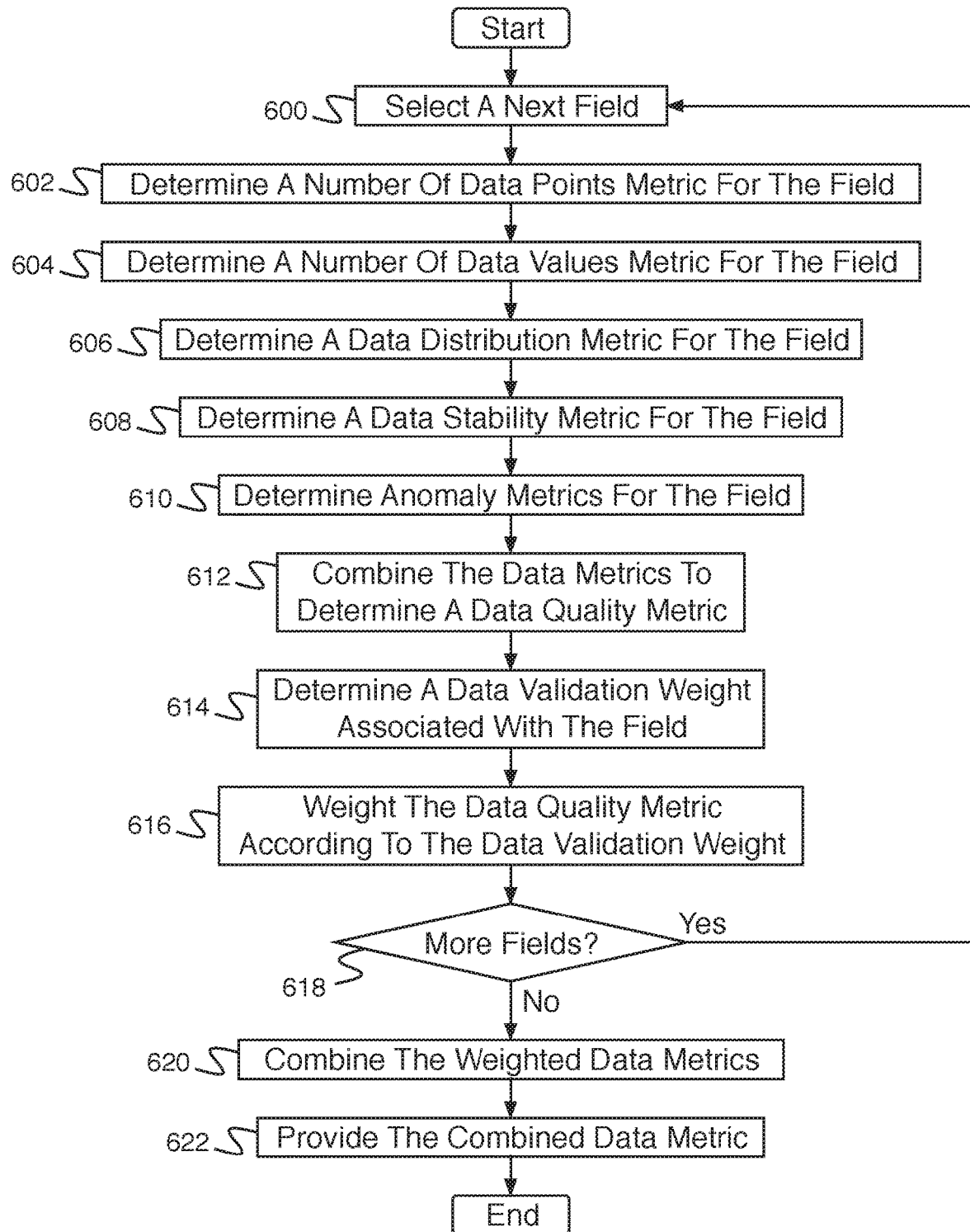
FIG. 6 is a flow diagram illustrating an embodiment of a process for calculating a data quality metric for the data set, wherein the data quality metric is based at least in part on a data distribution metric.

FIG. 6 is a flow diagram illustrating an embodiment of a process for calculating a data quality metric for the data set, wherein the data quality metric is based at least in part on a data distribution metric. In some embodiments, the process of FIG. 6 implements 504 of FIG. 5. In the example shown, in 600, a next field is selected. In some embodiments, a first field is selected. For example, a field comprises a data category, a data column, a measurement type, etc. In 602, a number of data points metric for the field is determined. In 604, a number of data values metric for the field is determined. In 606, a data distribution metric for the field is determined. In 608, a data stability metric for the field is determined. In 610, anomaly metrics for the field are determined. For example, anomaly metrics for the field comprise an invoice changed metric, a mismarked termination metric, an accounts receivable cheating metric, etc. In 612, the data metrics are combined to determine a data quality metric. For example, the data metrics are added, the data metrics are weighted and added, a nonlinear formula is applied to the data metrics, etc. In 614, a data validation weight associated with the field is determined. In 616, the data quality metric is weighted according to the data validation weight. For example, the data quality metric is multiplied by the data validation weight. In 618, it is determined whether there are more fields. In the event it is determined that there are more fields, control passes to 600. In the event it is determined that there are not more fields, control passes to 620. In 620, the weighted data metrics are combined. For example, the weighted data metrics are added, the weighted data metrics are multiplied, the weighted data metrics are combined using a nonlinear formula, etc. In 622, the combined data metric is provided.

Figure 7:
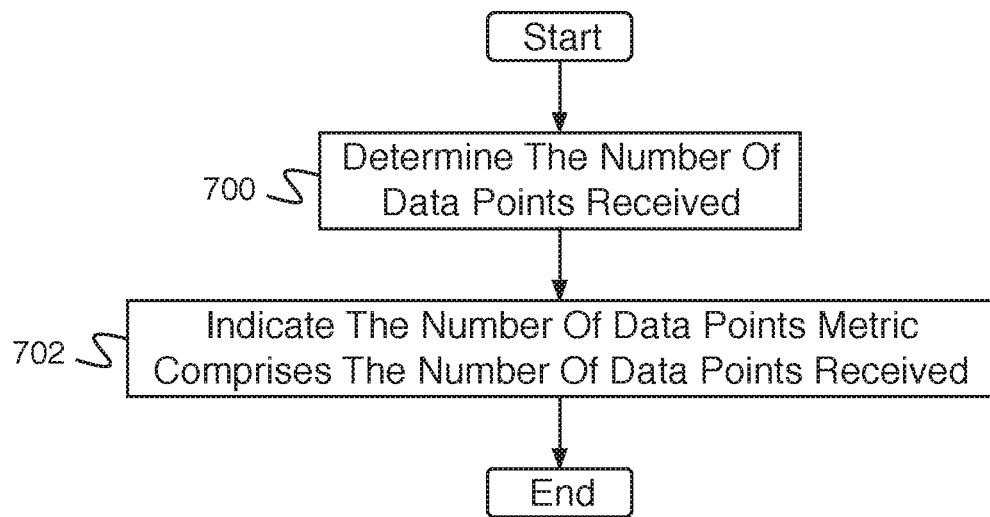
FIG. 7 is a flow diagram illustrating an embodiment of a process for determining a number of data points metric.

FIG. 7 is a flow diagram illustrating an embodiment of a process for determining a number of data points metric. In some embodiments, the process of FIG. 7 implements 602 of FIG. 6. In the example shown, in 700, a number of data points received is determined. In 702, the process indicates the number of data points metric comprises the number of data points received.

Figure 8:
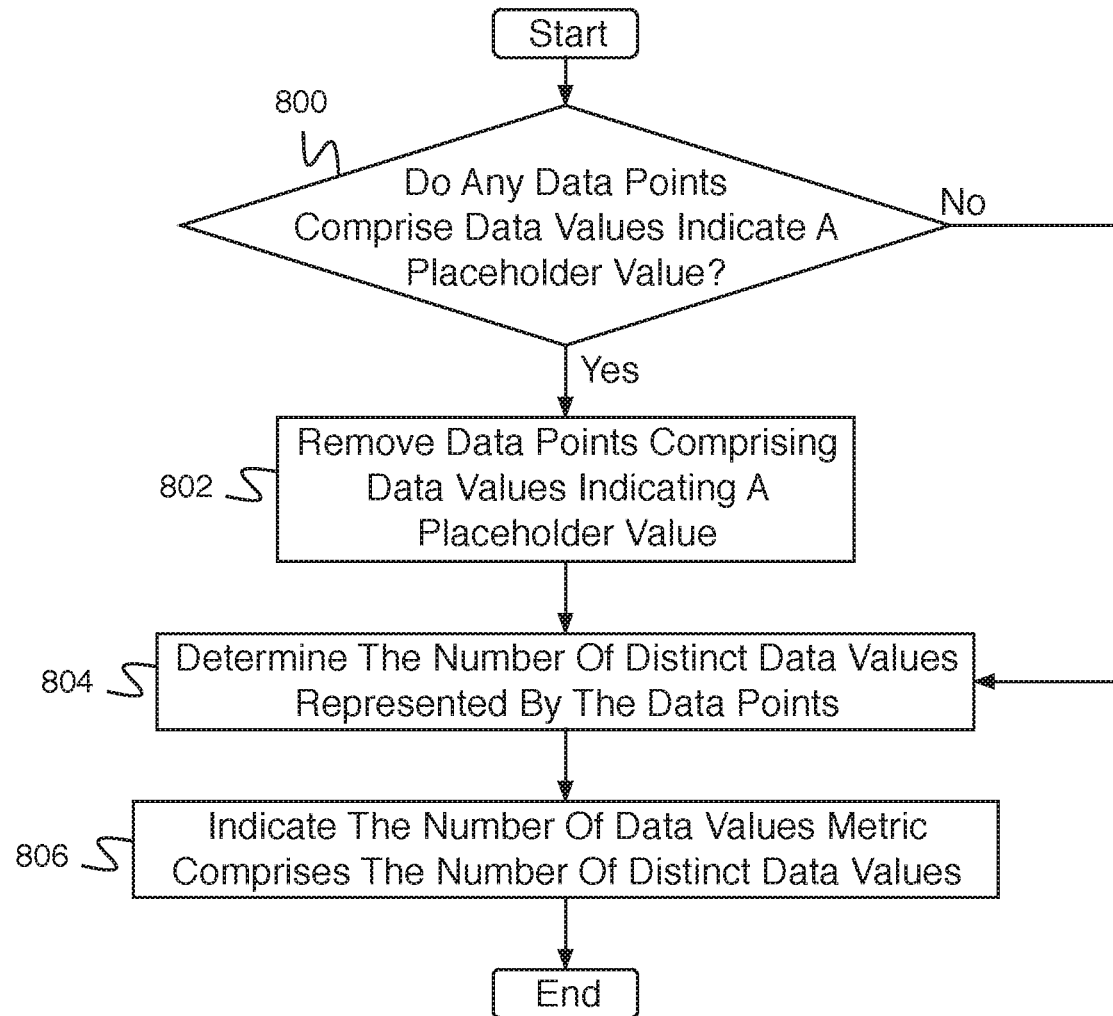
FIG. 8 is a flow diagram illustrating an embodiment of a process for determining a number of data values metric.

FIG. 8 is a flow diagram illustrating an embodiment of a process for determining a number of data values metric. In some embodiments, the process of FIG. 8 implements 604 of FIG. 6. In the example shown, in 800, it is determined whether any data points comprise data values indicating a placeholder value. For example, a placeholder value comprises the value "NO DATA", "NULL", −999999, etc. A placeholder value comprises a value indicating that no data was measured for the data point. In the event it is determined that no data points comprise data values indicating a placeholder value, control passes to 804. In the event it is determined that one or more data points comprise data values indicating a placeholder value, control passes to 802. In 802, data points comprising data values indicating a placeholder value are removed. In 804, the number of distinct data values represented by the data points is determined. In 806, the process indicates that the number of data values metric comprises the number of distinct data values.

Figure 9:
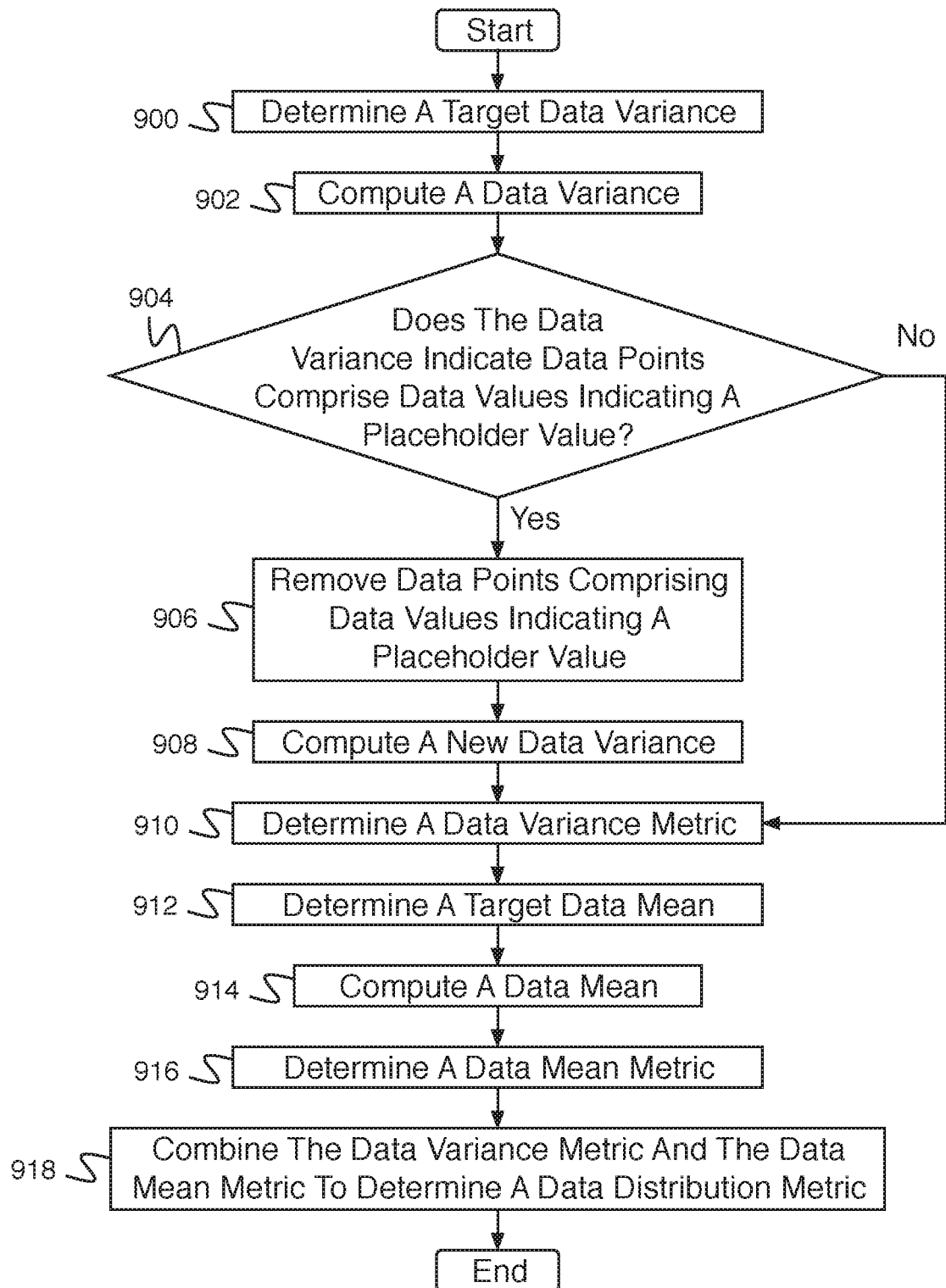
FIG. 9 is a flow diagram illustrating an embodiment of a process for determining a data distribution metric.

FIG. 9 is a flow diagram illustrating an embodiment of a process for determining a data distribution metric. In some embodiments, the process of FIG. 9 implements 606 of FIG. 6. In the example shown, in 900, a target data variance is determined. For example, a target data variance comprises a data variance received by an administrator, a data variance determined from other data (e.g., a data variance determined from another data set known to have a correct data distribution), etc. In 902, a data variance is computed. In 904, it is determined whether the data variance indicates that data points comprise data indicating a placeholder value. In the event it is determined that the data variance does not indicate that data points comprise data indicating a placeholder value, control passes to 910. In the event it is determined that the data variance indicates data points comprise data values indicating a placeholder value, control passes to 906. In 906, data points comprising data values indicating a placeholder value are removed. In 908, a new data variance is computed. In 910, a data variance metric is determined. For example, a data variance metric comprises a difference between the determined data variance and the target data variance, a ratio of the determined data variance and the target data variance, a nonlinear function of the determined data variance and the target data variance, etc. In 912, a target data mean is determined. For example, a target data mean comprises a data mean received by an administrator, a data mean determined from other data (e.g., a data mean determined from another data set known to have a correct data distribution), etc. In 914, a data mean is computed. In 916, a data mean metric is determined. For example, a data mean metric comprises a difference between the determined data mean and the target data mean, a ratio of the determined data mean and the target data mean, a nonlinear function of the determined data mean and the target data mean, etc. In 918, the data variance metric and the data mean metric are combined to determine a data distribution metric. For example, the data variance metric and the data mean metric are added, multiplied, input to a nonlinear function, etc.

Figure 10:
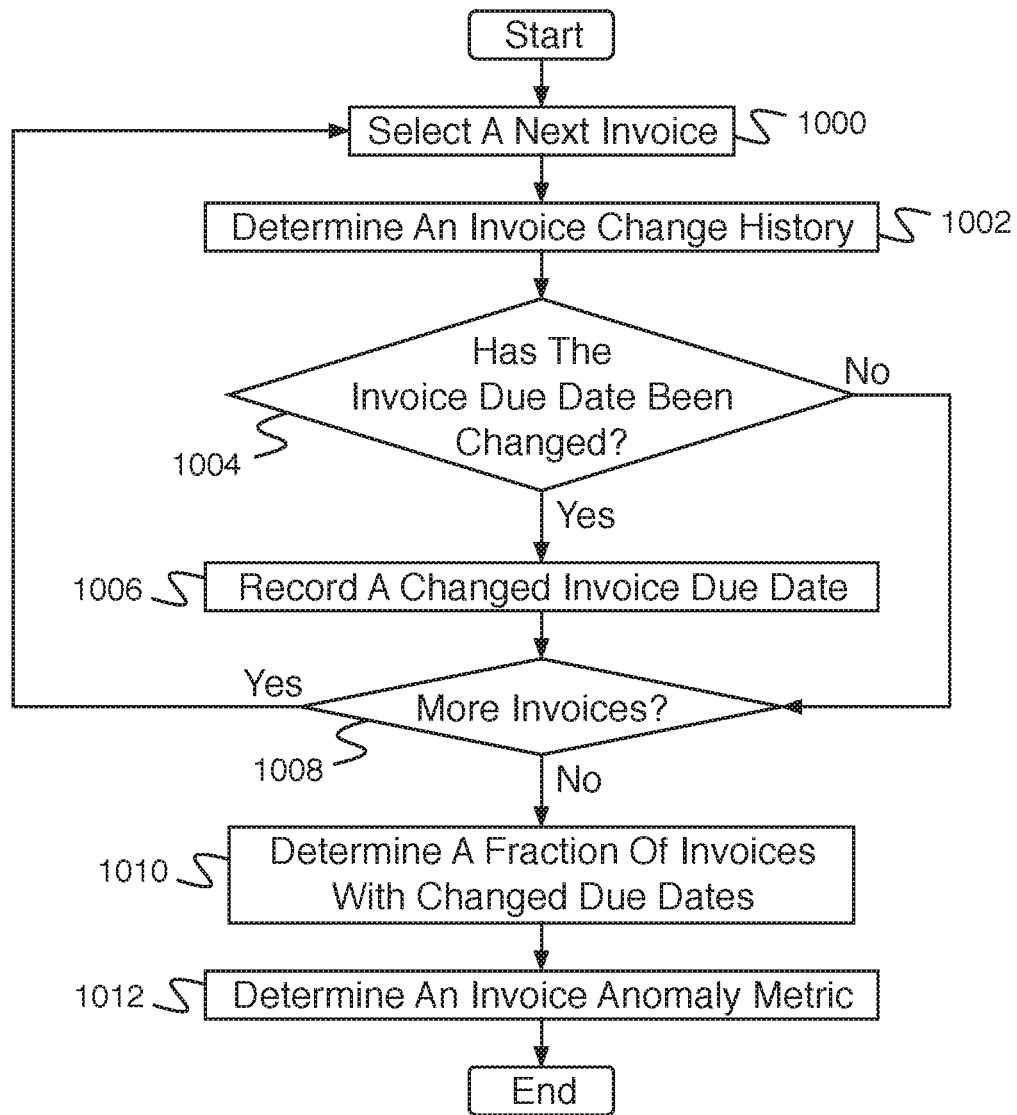
FIG. 10 is a flow diagram illustrating an embodiment of a process for determining an invoice anomaly metric.

FIG. 10 is a flow diagram illustrating an embodiment of a process for determining an invoice anomaly metric. In some embodiments, the process of FIG. 10 implements 610 of FIG. 6 for an invoice anomaly metric. An invoice anomaly metric comprises a metric corresponding to a fraction of invoices including a changed date. In the example shown, in 1000, a next invoice is selected. For example, a next invoice is selected from a set of invoices of accounting data. In 1002, an invoice change history is determined. For example, an invoice change history comprises a set of historical data describing changes made to the invoice over time. In 1004, it is determined whether the invoice due date has been changed. For example, it is determined whether any of the changes of the invoice change history comprise changes to the invoice due data. In the event it is determined that the invoice due date has not been changed, control passes to 1008. In the event it is determined that the invoice due date has been changed, control passes to 1006. In 1006, a changed invoice due date is recorded. In 1008, it is determined whether there are more invoices (e.g., of the set of invoices). In the event it is determined that there are more invoices, control passes to 1000. In the event it is determined that there are not more invoices, control passes to 1010. In 1010, a fraction of invoices with changed due dates is determined. In 1012, an invoice anomaly metric is determined. For example, the invoice anomaly metric comprises the fraction of invoices with changed due dates, a nonlinear function of the fraction of invoices with changed due dates, the inverse of the fraction of invoices with changed due dates, a thresholding function of the fraction of invoices with changed due dates, etc. For example, the invoice anomaly metric is used as part of determining a data quality metric for building a model for determining whether an invoice is likely to be paid on time. In the event the invoice anomaly metric is poor (e.g., a large fraction of invoices have changed due dates), it is very difficult to determine reliably whether an invoice was paid on time or not. Without having reliable data describing whether invoices were paid on time, a good quality model for determining whether an invoice is likely to be paid on time cannot be built. However with reliable data, a model can be built to determine whether an invoice is likely to be paid on time.

Figure 11:
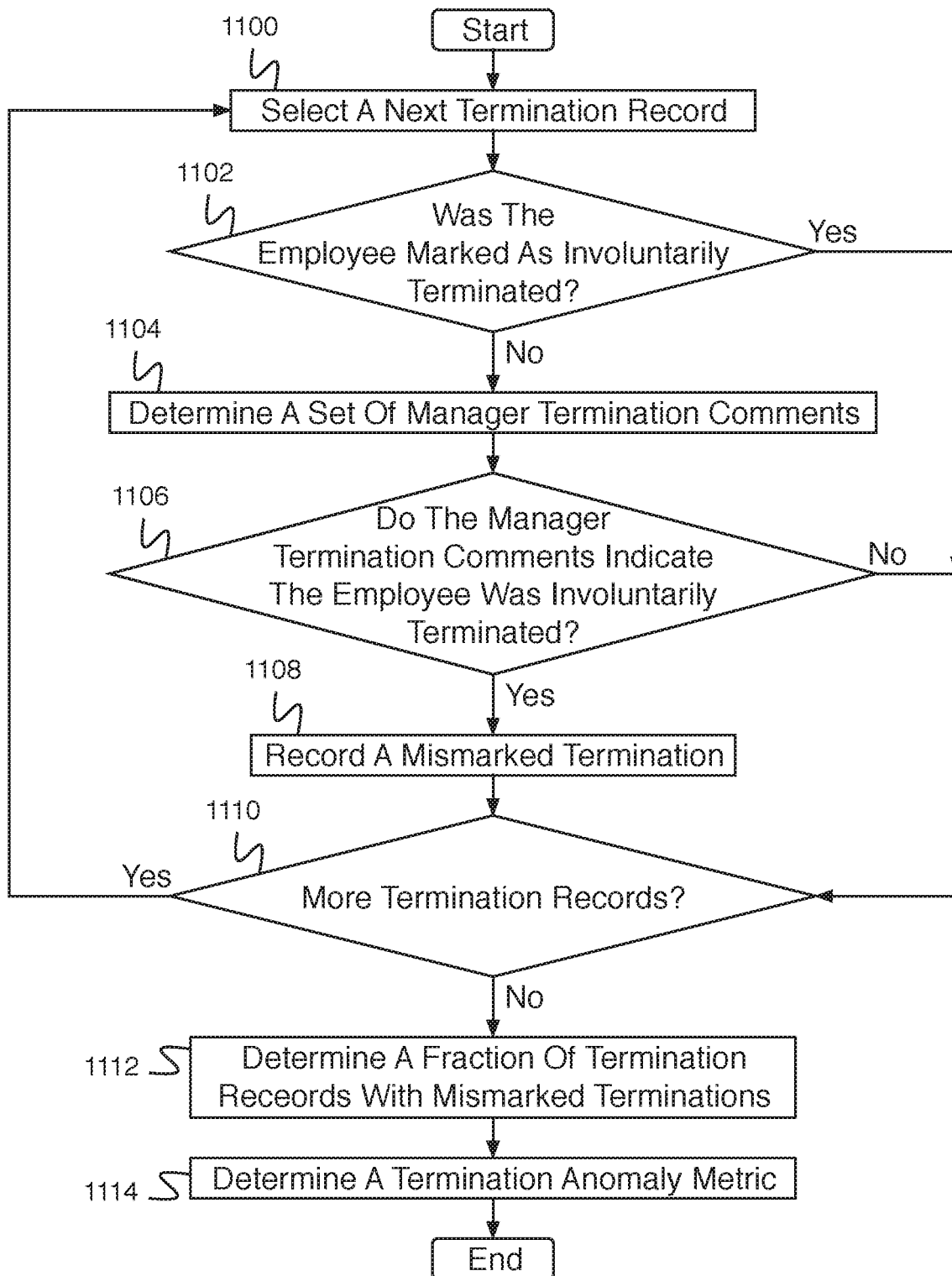
FIG. 11 is a flow diagram illustrating an embodiment of a process for determining a termination anomaly metric.

FIG. 11 is a flow diagram illustrating an embodiment of a process for determining a termination anomaly metric. In some embodiments, the process of FIG. 11 implements 610 of FIG. 6 for a termination anomaly metric. A termination anomaly metric comprises a metric corresponding to a fraction of employee termination records wherein the employee was terminated involuntarily but marked in the database system as terminated by mutual agreement. In the example shown, in 1100, a next termination record is selected. For example, a termination record comprises documentation filed by a manager associated with an employee termination. In 1102, it is determined whether an employee was marked as involuntarily terminated. In the event the employee was marked as involuntarily terminated, control passes to 1110. In the event the employee was not marked as involuntarily terminated, control passes to 1104. In 1104, a set of manager termination comments is determined. In 1106, it is determined whether the manager termination comments indicate that the employee was involuntarily terminated. In the event the manager termination comments indicate that the employee was not involuntarily terminated, control passes to 1110. In the event the manager comments indicate that the employee was involuntarily terminated, control passes to 1108. In 1108, a mismarked termination is recorded. In 1110, it is determined whether there are more termination records. In the event it is determined that there are more termination records, control passes to 1100. In the event it is determined that there are not more termination records, control passes to 1112. In 1112 a fraction of termination records with mismarked terminations is determined. In 1114, a termination anomaly metric is determined. For example, the termination anomaly metric comprises the fraction of termination records with mismarked terminations, a nonlinear function of the fraction of termination records with mismarked terminations, the inverse of the fraction of termination records with mismarked terminations, a thresholding function of the fraction of termination records with mismarked terminations, etc. For example, the termination anomaly metric is used as part of determining a data quality metric for building a model for determining if an employee is likely to decide to leave the company. In the event the termination anomaly metric is poor (e.g., a large fraction of termination records have mismarked terminations), it is very difficult to determine reliably whether an employee was terminated or decided to leave the company. Without having reliable data describing whether employees were terminated or decided to leave the company, a good quality model for determining whether an employee is likely to leave cannot be built. However with reliable data, a model can be built to determine whether an employee is likely to be decide to leave the company.

Figure 12:
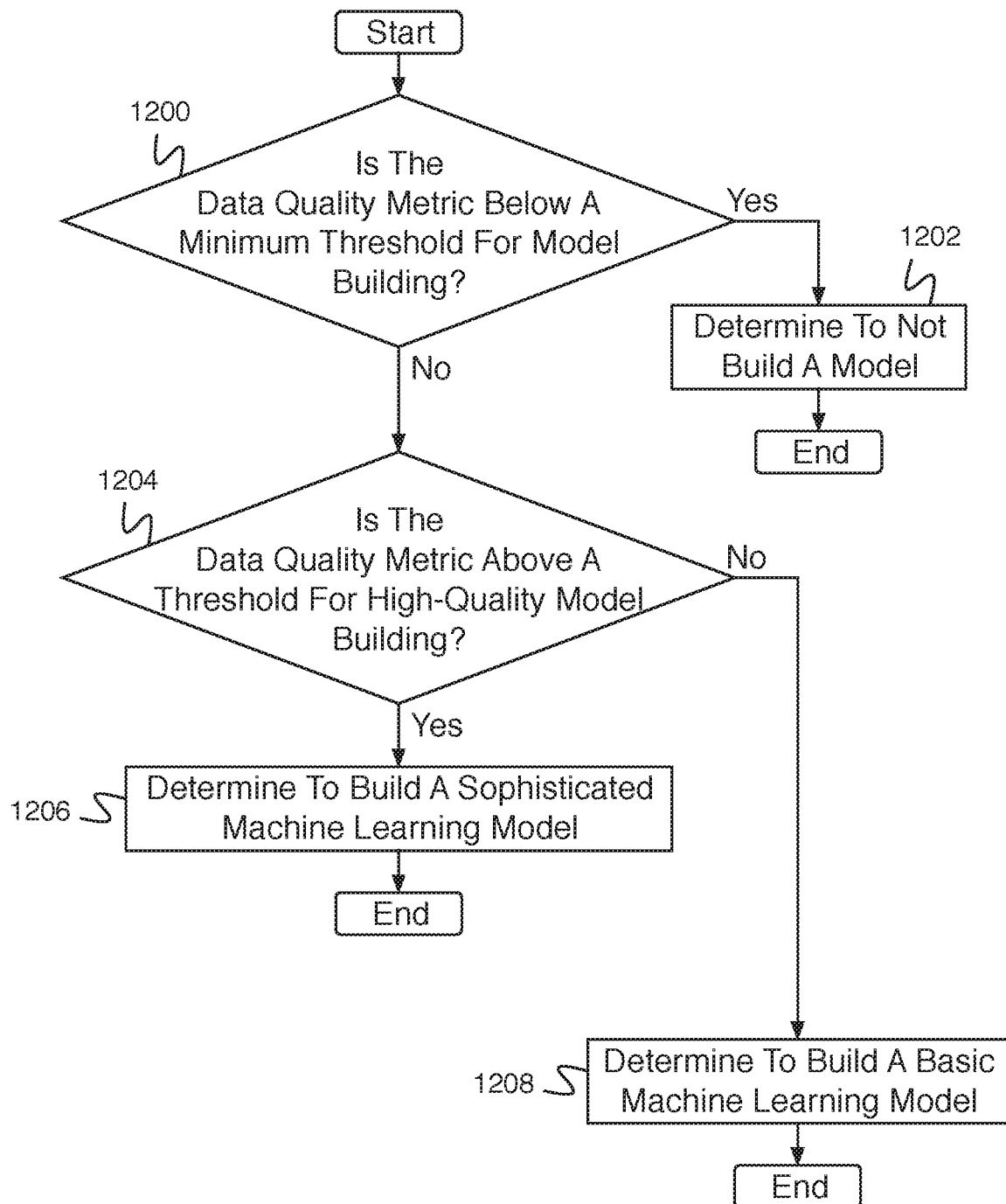
FIG. 12 is a flow diagram illustrating an embodiment of a process for determine a model to build based at least in part on a data quality metric.

FIG. 12 is a flow diagram illustrating an embodiment of a process for determine a model to build based at least in part on a data quality metric. In some embodiments, the process of FIG. 12 implements 508 of FIG. 5. In the example shown, in 1200, it is determined whether the data quality metric is below a minimum threshold for model building. In the event the data quality metric is below a minimum threshold for model building, control passes to 1202. In 1202, the process determines to not build a model, and the process ends. For example, no model is built, a simple algorithm is used in place of a model, a non-customized algorithm is used in place of a model, etc. In the event it is determined in 1200 that the data quality is not below a minimum threshold for model building, control passes to 1204. In 1204, it is determined whether the data quality metric is above a threshold for high-quality model building. In the event it is determined that the data quality metric is above the threshold for high-quality model building, control passes to 1206. In 1206, the process determines to build a sophisticated machine learning model, and the process ends. When appropriate, machine learning model parameters corresponding to a high quality model are chosen. In the event it is determined in 1204 that the data quality metric is not above a threshold for high-quality model building, control passes to 1208. In 1208, the process determines to build a basic machine learning model, and the process ends. When appropriate, machine learning model parameters corresponding to a basic model are chosen.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for validating data, comprising:
an interface configured to receive a data set; and
a processor configured to:
calculate a data quality metric for the data set, wherein the data quality metric is based at least in part on a data distribution metric;
retrieve a first data quality metric threshold and a second data quality metric threshold, wherein the first data quality metric threshold and the second data quality metric threshold are determined based at least in part on past metrics or past quality, and wherein the second data quality metric threshold is higher than the first data quality metric threshold;
in response to a determination that the data quality metric exceeds the first data quality metric threshold, determine a model to build, comprising to:
determine whether the data quality metric exceeds the second threshold;
in response to a determination that the data quality metric does not exceed the second threshold, build a basic machine learning model;
in response to a determination that the data quality metric exceeds the second threshold, build a sophisticated machine learning model; and
provide the basic machine learning model or the sophisticated machine learning model for use.

2. The system of claim 1, wherein the data distribution metric comprises a comparison of a data variance to a target data variance.

3. The system of claim 1, wherein the data distribution metric comprises a comparison of a data mean to a target data mean.

4. The system of claim 1, wherein the data distribution metric comprises a comparison of a data distribution with a target data distribution received from an administrator.

5. The system of claim 1, wherein the data distribution metric comprises a comparison of a data distribution with a target data distribution derived from other data.

6. The system of claim 1, wherein determining the data quality metric comprises removing data points comprising data values indicating a placeholder value.

7. The system of claim 1, wherein determining the data quality metric for the data set comprises determining a number of data points metric.

8. The system of claim 1, wherein determining the data quality metric for the data set comprises determining a number of distinct data values metric.

9. The system of claim 1, wherein determining the data quality metric for the data set comprises determining a data stability metric.

10. The system of claim 1, wherein determining the data quality metric for the data set comprises determining anomaly metrics.

11. The system of claim 10, wherein the anomaly metrics comprise an invoice changed metric, a mismarked termination metric, or an accounts receivable cheating metric.

12. The system of claim 1, wherein determining the data quality metric for the data set comprises combining a set of data metrics.

13. The system of claim 1, wherein determining the data quality metric for the data set comprises determining a data quality metric for each field of a set of fields.

14. The system of claim 13, wherein each field of the set of fields comprises an associated data validation weight.

15. The system of claim 14, wherein determining the data quality metric for the data set comprises combining a weighted set of data metrics.

16. The system of claim 1, wherein the processor is further configured to in response to a determination that the data quality metric does not exceed a low quality metric threshold, determine not to build the model, wherein the low quality metric threshold does not exceed the first data quality metric threshold.

17. The system of claim 1, wherein determining the model to build comprises selecting the model to build of a set of models to build.

18. The system of claim 1, wherein determining the model to build comprises determining model parameters.

19. The system of claim 1, wherein building the model comprises providing an indication of the data quality metric to an administrator.

20. The system of claim 19, wherein providing the indication of the data quality metric to an administrator comprises providing an indication of a critical data field to the administrator.

21. The system of claim 1, wherein using the model comprises providing an indication of the data quality metric to a user.

22. The system of claim 21, wherein providing the indication of the data quality metric to a user comprises providing an indication of a determined model to build to the user.

23. A method for validating data, comprising:
receiving a data set;
calculating, using a processor, a data quality metric for the data set, wherein the data quality metric is based at least in part on a data distribution metric;
retrieving a first data quality metric threshold and a second data quality metric threshold, wherein the first data quality metric threshold and the second data quality metric threshold are determined based at least in part on past metrics or past quality, and wherein the second data quality metric threshold is higher than the first data quality metric threshold;
in response to a determination that the data quality metric exceeds the first data quality metric threshold, determining a model to build, comprising:
determining whether the data quality metric exceeds the second threshold;
in response to a determination that the data quality metric does not exceed the second threshold, building a basic machine learning model;
in response to a determination that the data quality metric exceeds the second threshold, building a sophisticated machine learning model; and
providing the basic machine learning model or the sophisticated machine learning model for use.

24. A computer program product for validating data, the computer program product being embodied in a non-transitory computer readable storage medium and comprising computer instructions for:
receiving a data set;
calculating, using a processor, a data quality metric for the data set, wherein the data quality metric is based at least in part on a data distribution metric;
retrieving a first data quality metric threshold and a second data quality metric threshold, wherein the first data quality metric threshold and the second data quality metric threshold are determined based at least in part on past metrics or past quality, and wherein the second data quality metric threshold is higher than the first data quality metric threshold;
in response to a determination that the data quality metric exceeds the first data quality metric threshold, determining a model to build, comprising:
determining whether the data quality metric exceeds the second threshold;
in response to a determination that the data quality metric does not exceed the second threshold, building a basic machine learning model;
in response to a determination that the data quality metric exceeds the second threshold, building a sophisticated machine learning model; and
providing the basic machine learning model or the sophisticated machine learning model for use.

* * * * *